US007095314B2

(12) United States Patent
Kemper

(10) Patent No.: US 7,095,314 B2
(45) Date of Patent: Aug. 22, 2006

(54) EVENT REPORTING SYSTEM WITH CONVERSION OF LIGHT INDICATIONS INTO VOICED SIGNALS

(75) Inventor: Jonathan T. Kemper, San Diego, CA (US)

(73) Assignee: Directed Electronics, Inc., Vista, CA (US)

( * ) Notice: Subject to any disclaimer, the term of this patent is extended or adjusted under 35 U.S.C. 154(b) by 126 days.

(21) Appl. No.: 10/789,060

(22) Filed: Feb. 27, 2004

(65) Prior Publication Data

US 2005/0190069 A1 Sep. 1, 2005

(51) Int. Cl.
*B60Q 1/00* (2006.01)

(52) U.S. Cl. .............................. 340/425.5; 340/426.1; 340/426.15; 340/521; 340/531; 340/692; 340/825.36

(58) Field of Classification Search ............ 340/425.5, 340/426.1, 426.28, 426.29, 426.33, 428, 340/825.22, 825.27, 531, 692, 825.36, 5.2, 340/5.21, 426.14, 426.15, 426.16, 521, 825.49, 340/825.69, 825.72; 180/257, 272, 286, 180/287, 167
See application file for complete search history.

(56) References Cited

U.S. PATENT DOCUMENTS 4,856,072 A * 8/1989 Schneider et al. ............ 381/86
4,887,064 A * 12/1989 Drori et al. ................ 340/5.23
5,704,008 A * 12/1997 Duvall, Jr. .................. 704/273
5,812,067 A * 9/1998 Bergholz et al. ........... 340/5.52
6,480,117 B1 * 11/2002 Flick ..................... 340/825.69
6,496,107 B1 * 12/2002 Himmelstein ............ 340/426.1
2004/0100396 A1 * 5/2004 Antico et al.

* cited by examiner

*Primary Examiner*—Hung Nguyen
(74) *Attorney, Agent, or Firm*—KC Bean, Esq.; Anthony S. Weiser, Esq.

(57) ABSTRACT

A light-to-speech transforming circuit is coupled to an indicator light of a legacy security system. The transforming circuit detects flashes of the indicator light, interprets sequences of the flashes, and correlates the sequences to specific events monitored by the security system. The events are then correlated to speech segment data of various audible announcements. The segment data is used to drive a speaker, so that the user can hear the announcements. The transforming circuit can include a learning feature, whereby it prompts the user to cause specific events of the security system, such as zone violations, and then prompts the user to speak the announcements corresponding to the events. The transforming circuit records the flashing sequences and the announcements corresponding to the sequences, and delivers the announcements when the corresponding events occur during operation of the security system.

27 Claims, 6 Drawing Sheets

EVENT REPORTING SYSTEM WITH CONVERSION OF LIGHT INDICATIONS INTO VOICED SIGNALS

FIELD OF THE INVENTION

The present invention relates generally to security systems. More particularly, the invention relates to automotive security systems with latched event capabilities and visual event annunciators.

BACKGROUND

Security systems are commonly used to prevent theft of vehicles or of vehicle contents, deter removal of vehicle components, for example, wheels and tires, discourage tampering and vandalism, and to enhance security of vehicle occupants. A typical security system includes a variety of sensors. The sensors may be connected essentially in parallel, so that the events detected by the sensors generate alarms, and the individual events are not distinguishable by either the security system or the end user of the security system. (An "event" is typically a security violation, such as unauthorized opening of a door, detection of breaking glass, or trunk opening; the word "event" also encompasses other incidents related to operation of the security system and occurrences in the environment monitored by the security system, such as self-diagnostic problem reporting.) More commonly, sensors are connected individually or in groups, also known as protection zones. Each security violation event can then be associated with a particular zone. Typical protection zones include door sensors protecting the passenger compartment, trunk opening sensor, hood opening sensor, motion detector, tilt sensor, glass break sensor, and proximity sensors.

The security system sensors report events to a system controller. The controller can be a rather sophisticated programmable device capable of performing many tasks, such as self diagnostics. See, for example, commonly-assigned U.S. Pat. No. 4,887,064 to Drori et al., which is hereby incorporated by reference in its entirety. The controller can include or be coupled to an indicator light, for example, a light emitting diode (LED). Using the indicator light, the controller can generate a sequence of light flashes to communicate information to the user of the security system. The information flashed off to the user in this manner can include data regarding events, for example, violations that occurred after the system was armed, and self-diagnostic details, such as security system component failures, and low voltage of the vehicle battery.

In general, flashing sequences convey information to the user by varying the number of flashes, the lengths of the flashes, and the lengths of the intervals between consecutive flashes. The higher the number of reportable events, the longer and more complicated the flashing sequences become. To interpret a specific flashing sequence, the user may need to refer to a manual provided with the security system. Because this is rather inconvenient and impractical, it would be desirable to provide a way for interpreting flashing sequences without recourse to the manual or to another source that may not be readily available to the user of the security system. It would also be desirable to automate interpretation of the flashing sequences, so that the user of a legacy security system would not need to become familiar with the various codes output by the system, and would not need to memorize the codes. Furthermore, automating the process would avoid errors that can be made in interpreting the flashing sequences.

A security system indicator light is generally installed in a location where it is visible both from inside and outside of the vehicle. It is visible from the outside to deter would-be thieves and vandals. It is visible from the inside so that the security system user can read the flashing sequences and verify arming and disarming of the system. The indicator light is thus typically installed in an open location, and can be difficult to observe in daylight. Because indicator light stays ON or flashes when the security system is armed, it can be a major contributor to the total electrical load on the vehicle's battery. The average current through the indicator light is thus kept relatively low in many security system designs, making the light less bright. This aggravates the daylight visibility problem. It would thus be desirable to decrease reliance on the visibility of the indicator light when conveying the event information to the security system user.

A need thus exists to provide a way for users to interpret conveniently the event reporting flashing sequences of security systems. Another need exists for automating the process of interpreting the event reporting flashing sequences. A further need exists to help security system users to receive event information without relying on the visibility of the security system indicator light.

SUMMARY

The present invention is directed to apparatus and methods that satisfy one or more of these needs. In one embodiment, the invention herein disclosed is an event annunciator that includes a sound generating component, an indicator light interface circuit, and a processing component. The interface circuit is coupled to an indicator light of a security system to sense ON and OFF states of the indicator light and provide a first signal responsive to the states of the indicator light. The processing component, for example, a microprocessor or a microcontroller, is coupled to the interface circuit and to the sound generating component to receive the first signal and cause the sound generating component (for example, a speaker) to generate speech announcements in response to flashing sequences of ON and OFF states of the indicator light.

The event annunciator may further include a memory storing program code executed by the processing component. The processing component, operating under control of the code, receives the first signal and generates the speech announcements.

In some embodiments, the processing component uses a digital-to-analog converter to drive the sound generating component. The digital-to-analog converter can be a separate component, or it can be built into the processing component. In certain other embodiments, the processing component uses a dedicated voice synthesizer circuit to drive the sound generating component.

Coupling of the interface circuit to the indicator light may be electrical or optical.

In operation, the processing component receives sequences of different states of the first signal generated by flashing of the indicator light, and delimits the sequences. The processing component then determines the attributes of the delimited sequences, and compares the attributes of the delimited sequences to sets of attributes stored in the event annunciator. The sets can be stored in a memory, which can be part of the processing component, or a separate component. When the processing component determines that a match exists between the attributes of a delimited sequence and one of the sets of stored attributes, the processing component retrieves speech synthesis segment audio data corresponding to the matched set of stored attributes, and causes the sound generating component to reproduce the audio data to generate a speech announcement. The audio data can be stored in the same memory as program code, or in a different memory. In some embodiments, the audio data are stored in compressed form, and the processing component uncompresses the data before reproducing the speech announcement.

Some embodiments of the event annunciator include a microphone and a manual input device, such as a pushbutton. The microphone is coupled to the processing component so as to allow the processing component to sample microphone signals generated by the microphone from sounds, and the manual input device is coupled to the processing component to allow the processing component to sense the state of the manual input device.

Some embodiments include a learning feature that allows a user to program the flashing sequences and the speech announcements into the event annunciator. To implement the learning feature, the processing component prompts a user of the annunciator to cause the security system to generate at least one sample flashing sequence. The processing component receives the first signal resulting from the sample flashing signal and stores a first set of attributes of the sample flashing sequence in the memory. The processing component then prompts the user to speak into the microphone a first announcement that corresponds to the event associated with the sample flashing sequence. The processing component creates a first speech synthesis segment derived from microphone signals generated when the user speaks the first announcement into the microphone, and stores this segment in the memory. The segment is associated with the event. When the processing component receives a sequence that matches the first set of attributes in the future, it retrieves the first segment from the memory, and uses the segment to reproduce the first announcement.

These and other features and aspects of the present invention will be better understood with reference to the following description and appended claims.

DETAILED DESCRIPTION

Figure 1:
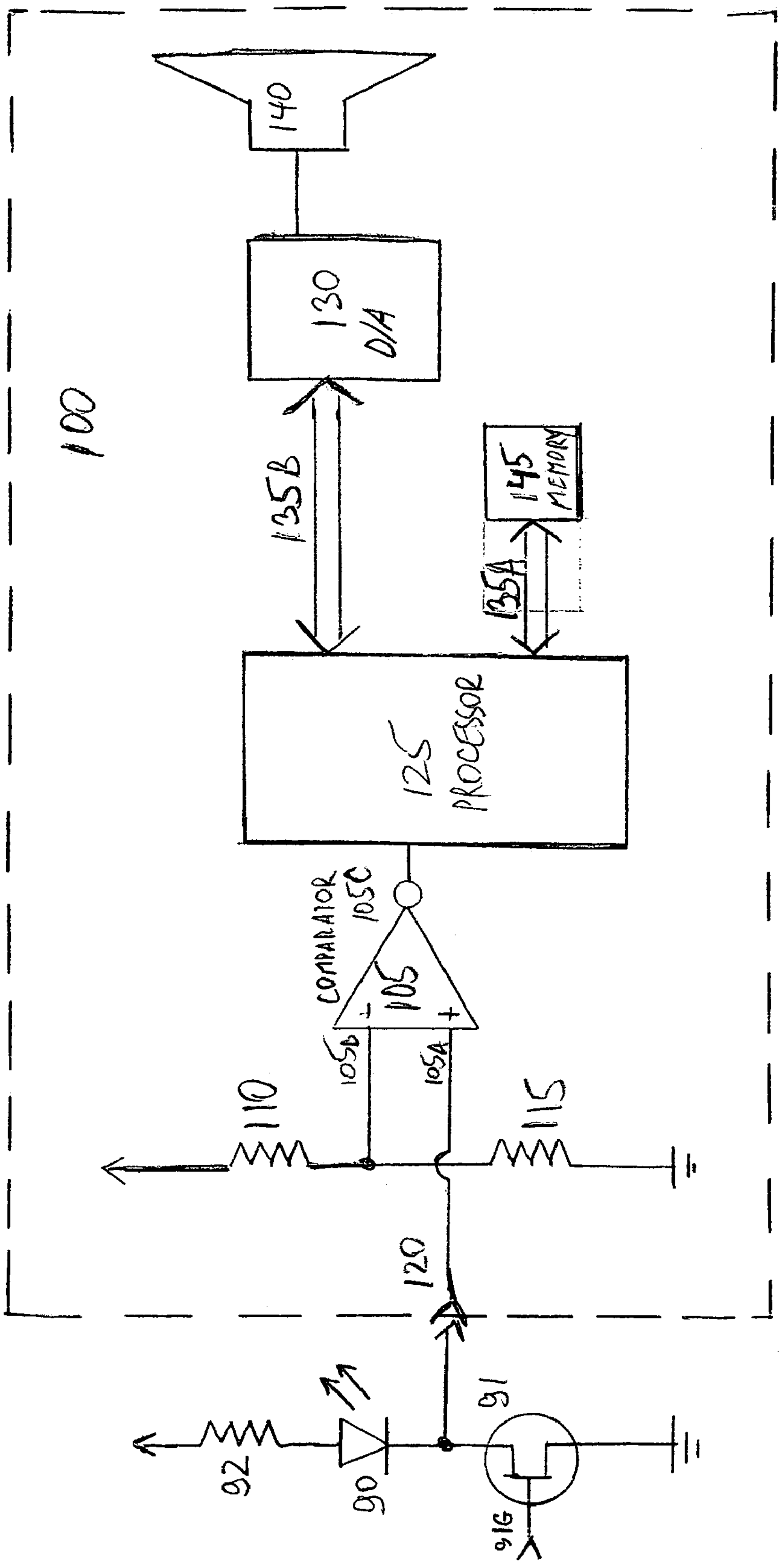
FIG. 1 is a simplified schematic diagram of a combination of an LED driving circuit of a security system with a light-to-speech transformer circuit, in accordance with the present invention.

Reference will now be made in detail to several embodiments of the invention that are illustrated in the accompanying drawings. Wherever practicable, same or similar reference numerals are used in the drawings and the description to refer to the same or like parts and steps. The drawings are in simplified form, not to scale, and omit many apparatus elements and method steps that can be added to the described systems and methods, while including many optional elements. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

Referring more particularly to the drawings, FIG. 1 is a high-level schematic diagram illustration of a light-to-speech transformer circuit 100. Terminal 120 taps into a light emitting diode (LED) driver circuit of a legacy security system, for example, a vehicle security system. As illustrated in FIG. 1, the driver circuit includes a field effect transistor (FET) switch 91 connected to a power source through an LED 90 and a current-limiting (current-setting) resistor 92. Here, the driver circuit is arranged in an open drain configuration, so that the signal at the gate 91G of the switch 91 turns the LED 90 ON and OFF, depending on polarity of the signal. The signal on the gate 91G is generated by the security system. When the LED 90 is turned ON, the voltage appearing on the terminal 120 is relatively low. Conversely, when the LED 90 is turned OFF, the voltage at the terminal 120 approaches that of the power supply operating the security system and the LED driver circuit. The transformer circuit 100 uses the voltage difference between the two states of the terminal 120 to distinguish between the periods when the LED 90 is turned ON and OFF.

The terminal 120 is connected to one input (105A) of an inverting comparator 105. A second input (105B) of the comparator 105 is biased by a voltage divider formed by resistors 110 and 115. The voltage at the junction of the resistors 110 and 115 falls between the two voltage states of the terminal 120 when the LED 90 is turned ON and OFF, respectively. Thus, the state of the output 105C of the comparator 105 changes, depending on whether the LED 90 is driven to the ON state (i.e., illuminated), or to the OFF state. The output of the comparator 105 connects to an input port of a processor 125. The processor 125 executes program code stored in a memory device 145.

Under control of the program code, the processor 125 senses the states of the output 105C of the comparator 105, and distinguishes between the periods when the LED 90 is turned ON and OFF. The memory 145 also stores a look-up table that correlates the various flashing sequences of the LED 90 to the monitored events corresponding to the sequences. Each event is further correlated to a speech synthesis segment containing audio data of a preprogrammed voice announcement. The processor 125 reproduces the speech segments through a digital-to-analog (D/A) converter 130 and a speaker 140. The speech synthesis segments are also stored in the memory 145.

In other variants of the transformer circuit 100, the terminal 120 connects to the juncture between the LED 90 and the current-limiting resistor 92. Indeed, the transformer circuit 100 illustrated in FIG. 1 can be easily modified to work with different LED driving circuits. For example, a small resistor can be inserted in series with the LED indicator light of the security system, and the voltage across the small resistor can be monitored to identify the flashing of the LED. Such current-sensing arrangement would generally work with any LED driving circuit.

Figure 1A:
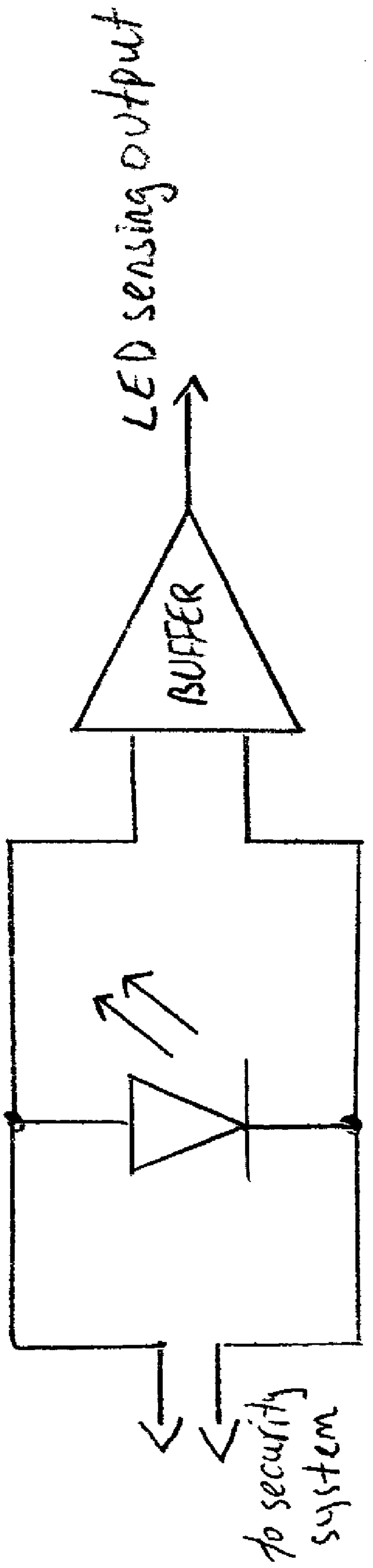
FIG. 1A is a simplified schematic diagram of one implementation of a circuit for sensing indicator light flashes for use in a light-to-speech transforming circuit, in accordance with the present invention.

LED flashes can also be sensed by connecting a buffer across the LED. This arrangement is illustrated in FIG. 1A.

Furthermore, the coupling between the security system LED driving circuit and the light-to-speech transformer circuit in accordance with the present invention need not be electrical. In some embodiments, the coupling is optical. In some of these embodiments, the light-to-speech transformer includes an optoelectronic sensor, such as an optical diode or optical transistor, closely coupled to the LED of the security system, and electronic circuitry for converting the signals generated by the optoelectronic sensor into digital levels recognizable by the processor.

Figure 2:
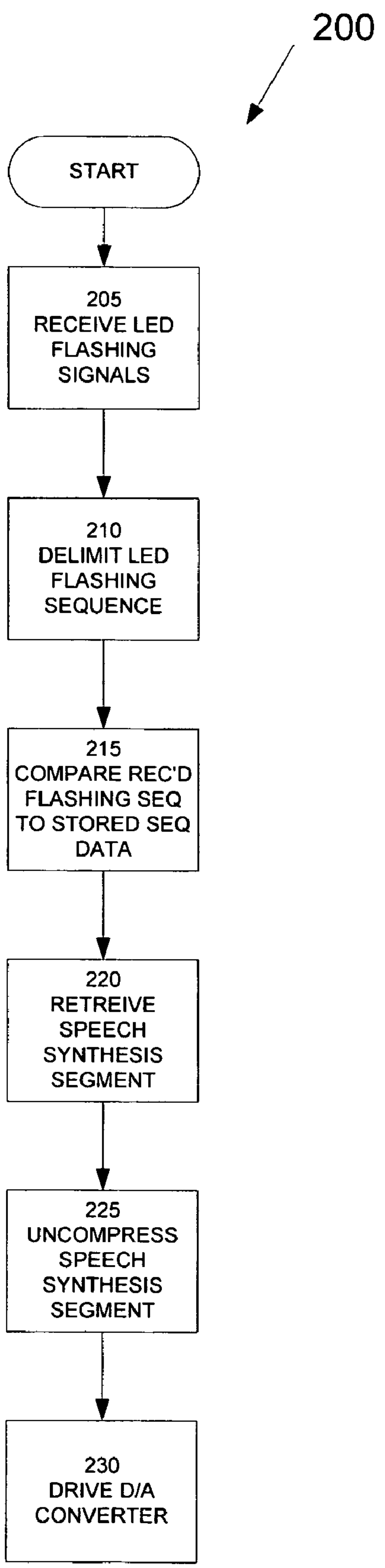
FIG. 2 is a simplified flow diagram of a process for transforming light indications into audible announcements, in accordance with the present invention.

Selected steps of a process 200 performed by the light-to-speech transformer 100 are illustrated in FIG. 2. At step 205, the processor 125 receives LED flashing signals from the comparator 105. At step 210, the processor 125 delimits an LED flashing sequence, so that it can process the sequence. For example, a relatively long period of inactivity (e.g., greater than 2 seconds) following one or more flashes can be interpreted as an end of one flashing sequence. LED flashes following this delimiter would be interpreted as parts of the following sequence.

At step 215, the processor 125 compares the received flashing sequence to the flashing sequence data stored in the memory 145. When an exact or close match is found between attributes of the received flashing sequence and attributes of one of the stored sequences, the processor identifies the monitored event of the received sequence and looks up the speech synthesis segment corresponding to the monitored event. The flashing sequence attributes examined by the processor 125 can include ON and OFF durations of the LED flashes, and the number of the flashes in the sequence.

After identifying the monitored event signaled by the LED flashes, the processor 125 retrieves the speech synthesis segment associated with the event from the memory 145, at step 220. The processor 125 uncompresses the speech segment, at step 225, and, at step 230, sends the uncompressed speech synthesis segment to the digital-to-analog (D/A) converter 130. The D/A controller 130 then drives the speaker 140 with the speech segment audio data, causing the speaker 140 to annunciate the monitored event to the user of the security system.

The steps of the process 200 are performed repeatedly, for each flashing sequence, and, therefore, the speaker 140 annunciates the monitored events as they occur. Note that the steps can be performed in parallel, in a pipelined manner, or otherwise. For example, the transformer 100 may be receiving and delimiting one flashing sequence at the same time as driving the D/A converter with data corresponding to a previously-received flashing sequence.

In variants of the illustrated embodiment, the processor 125 suppresses identical announcements that are closely spaced in time, e.g., within 30 seconds of each other. Suppression of the closely spaced identical announcements can be a programmable feature of the light-to-speech transformer circuit 100.

In one operational example, the security system detects a passenger compartment violation and flashes a corresponding sequence, such as a sequence of three equally spaced LED ON periods. The processor 125 detects the flashes, delimits the three-flash sequence, determines from the look-up table that the sequence corresponds to a passenger compartment violation, and loads from the memory 145 a speech synthesis segment corresponding to passenger compartment violations. The processor then uncompresses the speech segment data and sends the data of the segment to the D/A converter 130. The D/A converter 130 drives the speaker 140, generating an announcement of "WARNING! DOOR HAS BEEN OPENED. CHECK PASSENGER COMPARTMENT FOR INTRUDERS." Similarly, if a trunk sensor is triggered during an armed period, the transformer circuit 100 may generate an announcement of "ATTENTION: UNAUTHORIZED TRUNK ACCESS." These are of course merely exemplary events and announcements.

Figure 3:
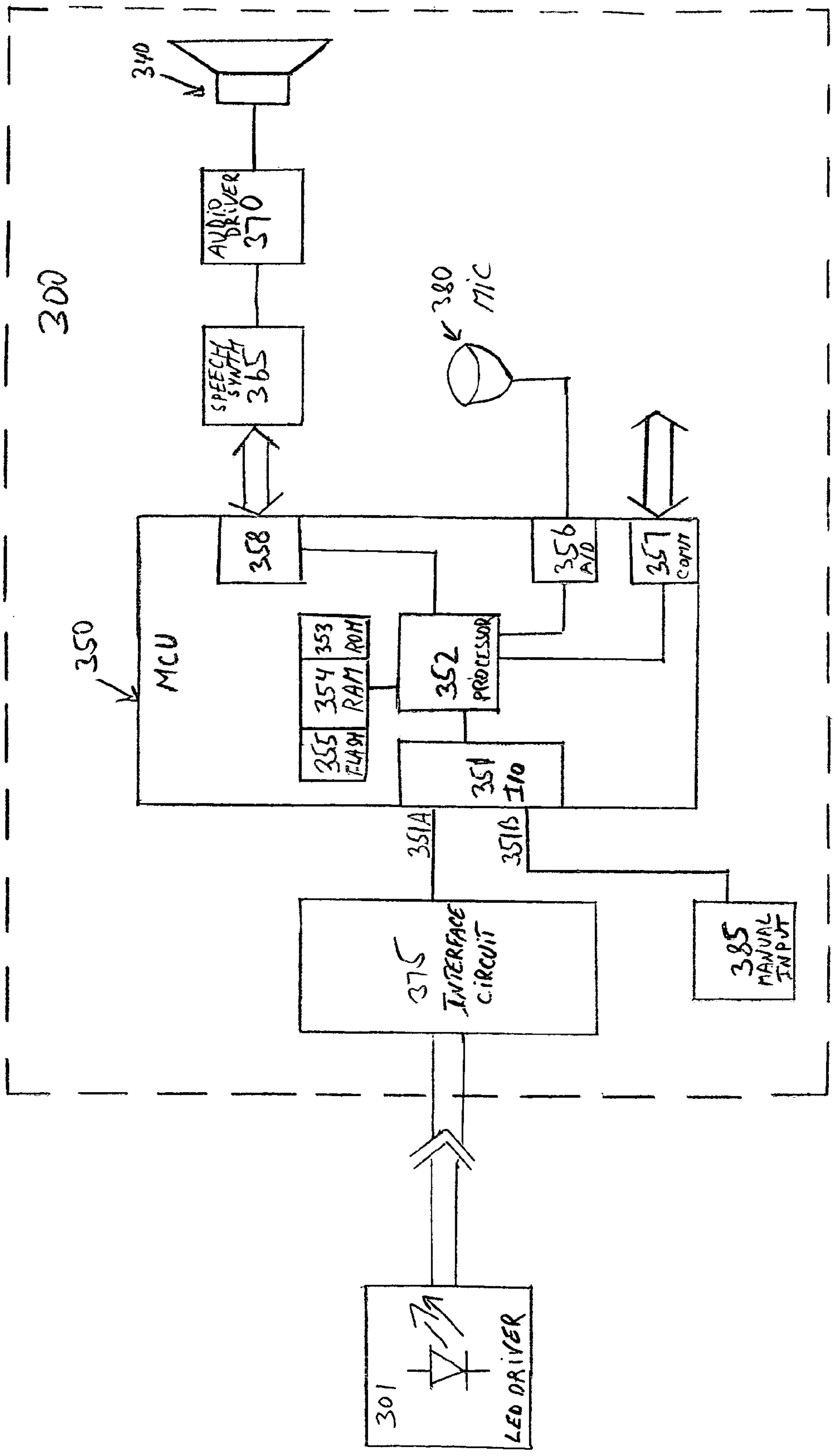
FIG. 3 is a simplified schematic diagram of a combination of an indicator light driving circuit of a security system with a microcontroller-based light-to-speech transformer circuit, in accordance with the present invention.

The processor 125, the memory 145, and the D/A controller 130 communicate over parallel connections 135A and 135B. In other variants of the transformer circuit 100, the connections between these components are serial. In still other embodiments, the connections are implemented as a single system bus. Moreover, the connections between the processor 125, memory 145, and D/A converter 130 need not be external; the processor 125, the D/A converter 130, and the memory 145 can be part of the same integrated circuit, such as an application specific integrated circuit (ASIC), or an embedded microcontroller. It should also be understood that the light-to-speech transformer circuit can include additional memories, both volatile memories, such as random access memory (RAM) used for storing computational results and parameters during processing, and non-volatile memories, such as read only memory (ROM), flash memory, electrically programmable read only memory (EPROM), and erasable EPROM (EEPROM). To illustrate these and several other concepts, FIG. 3 depicts, in a high-level, schematic diagram manner, a microcontroller-based light-to-speech transformer circuit 300 with on-board RAM, ROM, EEPROM, and D/A controller.

At the center of the light-to-speech transformer 300 lies a microcontroller 350, for example, a 68HC908AP8 series device, available from Motorola®. The microcontroller 350 includes a configurable general purpose input/output (I/O) port 351, processor 352, ROM 353, RAM 354, flash memory 355, and analog-to-digital (A/D) converter 356. The transformer circuit 300 further includes a speaker 340, speech synthesizer circuit 365, audio driver 370, LED driver interface circuit 375, microphone 380, and manual input device 385.

The LED driver interface circuit 375 is substantially similar to the circuit formed by the comparator 105 and the resistors 110 and 115 of FIG. 1. It is coupled to the LED driver circuit 301 to receive a signal indicative of the state of the LED of the security system. The output of the interface circuit 375 is coupled to an input 351A of the general purpose I/O port 351, enabling the microcontroller 350 to read the state of the security system LED. In alternative embodiments, the output of the LED driver interface circuit 375 is coupled to an interrupt input of the microcontroller 350, so that the microcontroller 350 need not check the status of the LED of the security system at frequent intervals, but can process flashing of the LED following interrupts generated by changing of the LED state. These embodiments allow the microcontroller 350 to enter an energy-saving "sleep" mode during periods of prolonged inactivity.

The manual input device 385 is a switch. Its state is monitored through an input 351B of the general purpose I/O port 351. In other embodiments, the state of the manual input device 385 is monitored using an interrupt input. Also, the manual input device 385 may include more than one switch, numeric and alphanumeric keys, rotary switches, and other similar components.

Normal operation of the transformer circuit 300 is similar to the operation of the light-to-speech transformer circuit 100, as depicted in FIG. 2. The microcontroller 350 receives LED flashing signals from the interface circuit 375, delimits one or more individual flashes into flashing sequence, and compares each flashing sequence to data stored in one of the memories (e.g., the ROM 353 or flash memory 355) to identify a monitored event. After the microcontroller 350 identifies a specific event, it retrieves a speech segment corresponding to the event from memory, for example, from the ROM 353, and sends the segment to the speech synthesizer circuit 365. The synthesizer circuit 365 uncompresses the segment (if the segment was stored in compressed form), and generates an audio signal that drives the speaker 340 through the audio driver 370.

In variants of the transformer circuit 300, the audio driver 370 is an audio amplifier, such as an LM386 device, available, for example, from National Semiconductor; in other variants, the driver 370 is a buffer with low output impedance, such as an 8-ohm driver.

In the illustrated embodiment, an HT81R03 single-chip voice synthesizer is used to implement the speech synthesizer circuit 365. The HT81R03 voice synthesizer is available from Holtek Semiconductor Inc., 4F-2, No. 3-2, YuanQu St., Nankang Software Park, Taipei 115, Taiwan, telephone number 886-2-2655-7070. Alternatively, the circuit 365 can be built around a device selected from the W523Axxx family of programmable speech synthesis integrated circuits, available from Winbond Electronics Corporation America, 2727 N. First Street, San Jose, Calif. 95134, telephone number 408-943-6666. These are merely two exemplary circuits; other devices and combinations of multiple devices can also be used for speech synthesis. Furthermore, speech synthesis can be performed by the processor 352, obviating the need for a separate speech synthesizer circuit. This has already been illustrated in FIG. 1.

The light-to-speech transformer circuit 300 can be manufactured with preprogrammed data of the speech synthesis segments and preprogrammed data used to identify the flashing sequences. The transforming circuit 300 can also receive the data through its communication port 357, and store the data in one of its memories. In different variants of the circuit, the source of the data is, for example, a dedicated programming device, a wired or wireless network interface, or a general purpose data processing system, such as a Wintel or MAC personal computer system, operating under control of program code that enables the system to send data through the port 357.

Figure 4:
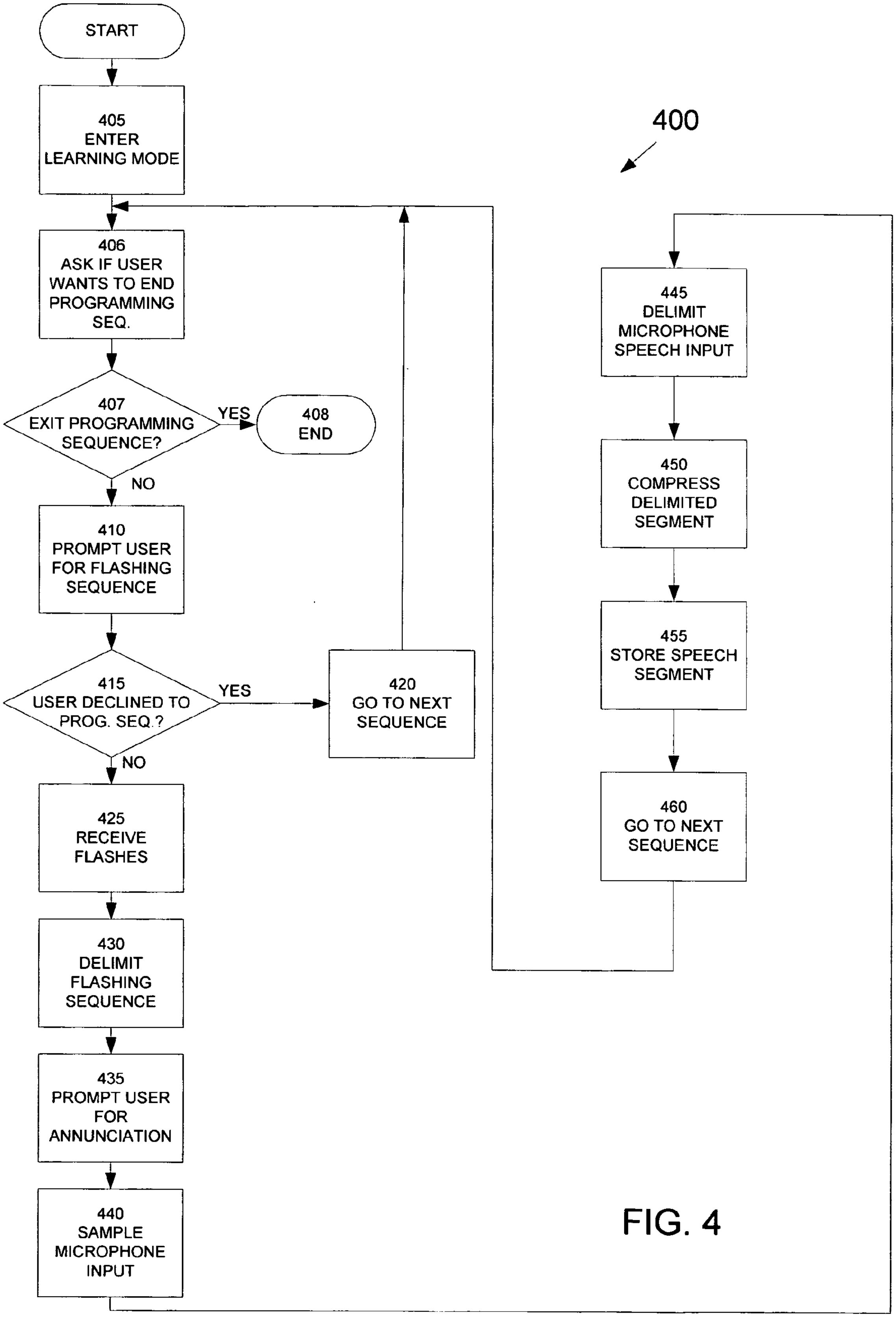
FIG. 4 is a simplified flow diagram of a process used to program flashing sequences and speech announcements into a light-to-speech transforming circuit, in accordance with the present invention.

The transformer circuit 300 can also receive actual speech, record it in its memory, for example, in flash memory 355, and associate the recorded speech with specific LED flashing sequences. An exemplary learning process 400, enabling the transformer circuit 300 to "learn" flashing sequences and record speech announcements, is illustrated in FIG. 4 and described below.

At step 405, the transformer circuit 300 enters a learning mode. This can be achieved, for example, by depressing a button of the manual input device 385 for a predefined period of time, such as 3 seconds. At step 406, the circuit 300 queries the user, through the speaker 340, whether the user wants to end the programming sequence and exit the learning mode. If the user wants to end the programming sequence, the user responds affirmatively, for example, by depressing the button of the manual input device 385 within a predetermined period of time. In decision block 407, the circuit 300 examines the user's response. If the user chooses to end the programming sequence, the process ends at termination point 408. Otherwise, process flow advances to step 410, where the transformer circuit 300 prompts the user, through the speaker 340, to cause the security system to flash a specific LED sequence. For example, the transformer 300 can instruct the user to cause a passenger compartment violation. If the user does not want to program this specific sequence, the user can signal the transformer to move to a next sequence. In the illustrated embodiment, this is done by depressing the button of the manual input device 385. If the transformer circuit 300 detects, at decision block 415, that the user has declined to program the sequence, the transformer circuit 300 increments the LED flashing sequence, at step 420, and prompts the user to program the next sequence, at step 410.

When the user decides to proceed with programming an LED flashing sequence, the user causes the alarm system to generate the sequence. As has already been explained, generating the LED sequence may involve arming the security system and creating a violation of one of the protection zones, or otherwise causing the event that corresponds to the sequence. At step 425, the transformer circuit 300 receives the LED flashing sequence, and delimits it at step 430. In delimiting the sequence, the microcontroller 350 relies on user input, received through the manual input device 385. In one alternative embodiment, the microcontroller 350 relies on preprogrammed logic to detect the end of the signal. For example, absence of LED flashing for a predefined period of time, such as 10 seconds, can be interpreted as the end of the sequence.

After the sequence has been delimited, the transformer circuit 300 prompts the user to speak the announcement corresponding to the LED flashing sequence (and to the event), at step 435. The user speaks the announcement into the microphone 380, which generates electrical signals from the user's speech. At step 440, the microcontroller 350 samples the electrical signals generated by the microphone, using the built-in A/D converter 356, and stores the samples as a speech segment in one of the memories, for example, in the flash memory 355. The stored speech segment is delimited, in step 445, similarly to the way the flashing signal was delimited in step 430. In some variants, for example, the user indicates the end of the segment using the manual input device 385; in other exemplary variants, the microcontroller 350 detects a period of silence at the end of speech, and delimits the segment accordingly. After the speech segment is delimited, it is compressed, at step 450. At step 455, the microcontroller 350 stores the speech segment in one of the memories, and, at step 460, process flow proceeds to programming the next flashing sequence, returning to step 406 at the beginning of the process 400.

Figure 5:
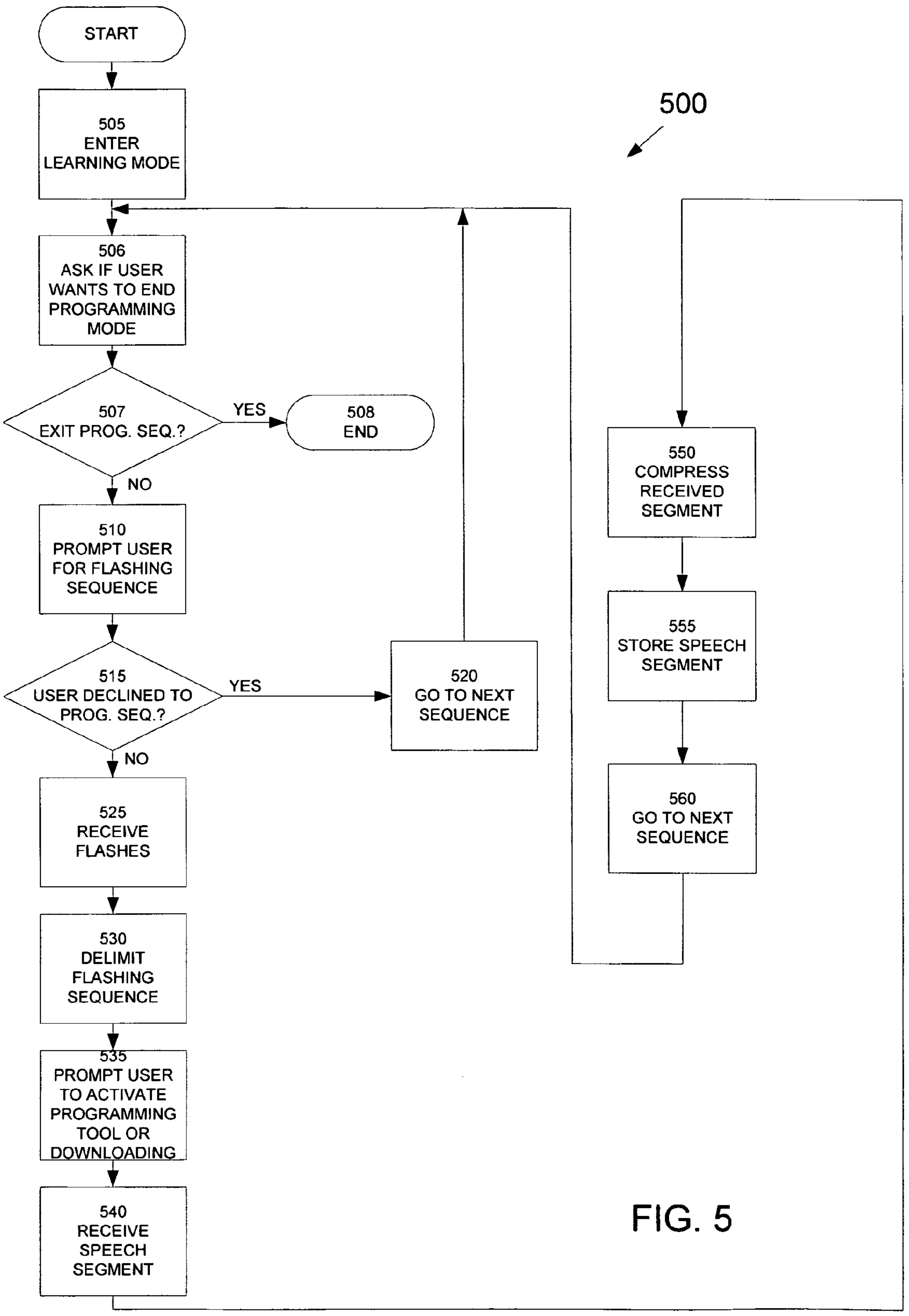
FIG. 5 is a simplified flow diagram of another process used to program flashing sequences and speech announcements into a light-to-speech transforming circuit, in accordance with the present invention.

One of the many alternative embodiments provides for a combination of a learning mode input with downloading (or otherwise programming) of the speech segments through the communication port 357. A learning process 500 of this embodiment is illustrated in FIG. 5. As can be seen from this Figure, the process 500 essentially follows the steps of the process 400 of FIG. 4 until step 535. Here, instead of speaking the announcement corresponding to the flashing sequence, the user activates the downloading or programming tool, which sends the speech segment data to the microcontroller 350 through the port 357. The microcontroller 350 receives the segment data, at step 540, compresses the segment data, at step 550, and stores the segment data, at step 555. At step 560, process flow proceeds to programming the next flashing sequence, returning to step 506 at the beginning of the process 500.

This document describes in considerable detail the inventive apparatus and methods for transforming flashing signal sequences of legacy security systems into speech. This is done for illustration purposes only. Neither the specific physical embodiments and methods of the invention as a whole, nor those of its features and steps limit the general principles underlying the invention. The specific features described herein may be used in some embodiments, but not in others, without departure from the spirit and scope of the invention as set forth. Various arrangements of components and various step sequences also fall within the intended scope of the invention. In particular, the invention is not limited to the specific coupling circuits, processors/controllers, speech synthesizers, and other components used in the above description, as should be apparent to a person of ordinary skill in the art. In sum, all embodiments and variants in this document are exemplary and illustrative; they are not intended to be strictly limiting. Furthermore, in the description and the appended claims, the words "couple," "connect," and similar expressions with their inflectional morphemes do not necessarily import an immediate or direct connection, but include connections through mediate elements within their meaning. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is performed by the claims and their equivalents.

I claim:

1. An event annunciator comprising:

a sound generating component;

an indicator light interface circuit coupled to an indicator light of a security system to sense ON and OFF states of the indicator light and provide a first signal responsive to the states of the indicator light; and a processing component coupled to the interface circuit and to the sound generating component to receive the first signal and cause the sound generating component to generate speech announcements in response to flashing sequences of ON and OFF states of the indicator light.

2. An event annunciator according to claim 1, further comprising a memory storing program code, wherein the processing component comprises a digital processor capable of executing the code, the digital processor being capable of receiving the first signal and generating the speech announcements under control of the code.

3. An event annunciator according to claim 2, wherein the indicator light interface circuit comprises a comparator capable of performing comparisons between a second signal from the security system and a predetermined level, and generating the first signal based on the comparisons.

4. An event annunciator according to claim 2, wherein the indicator light interface circuit comprises an optoelectronic component optically coupled to the indicator light to sense the states of the indicator light and generate the first signal in response to the states of the indicator light.

5. An event annunciator according to claim 2, wherein the processing component suppresses a first speech announcement that follows a second speech announcement within a first predetermined time period if the first speech announcement is identical to the second speech announcement.

6. An event annunciator according to claim 2, further comprising an digital-to-analog converter (DAC) coupled between the processing component and the sound generating component, wherein the processing component is capable of sending speech segments to the DAC to cause the DAC to drive the sound generating component with electronic audio signals corresponding to the speech announcements.

7. An event annunciator according to claim 2, wherein the memory further stores sets of attributes of flashing sequences, each set of attributes being associated with a sample flashing sequence and a security system event.

8. An event annunciator according to claim 7, wherein the digital processor is capable, under control of the code, of delimiting the flashing sequences of ON and OFF states of the indicator light and comparing attributes of each delimited sequence to one or more of the sets of attributes stored in the memory to identify a set of attributes matching the attributes of said each delimited sequence.

9. An event annunciator according to claim 8, wherein:

the memory further stores speech synthesis segments comprising audio data capable of being reproduced as the speech announcements, said each set of attributes being associated with at least one of the speech synthesis segments; and the digital processor is capable, under control of the code, of reproducing the audio data of said at least one of the speech synthesis segments when the processor identifies a delimited segment with attributes matching said each set of attributes.

10. An event annunciator according to claim 9, wherein:

the memory stores the speech synthesis segments in compressed form; and the processor, under control of the code, uncompresses said each segment before reproducing the audio data of said each segment.

11. An event annunciator according to claim 9, further comprising an digital-to-analog converter (DAC) coupled between the processor and the sound generating component, wherein the processor, under control of the code, reproduces the audio data of said each segment using the DAC to drive the sound generating component.

12. An event annunciator according to claim 9, wherein the memory comprises a non-volatile memory device storing the program code, and a volatile memory device used by the processor to store computational results.

13. An event annunciator according to claim 2, further comprising means for learning sets of attributes of the flashing sequences and the announcements corresponding to the sets of attributes.

14. An event annunciator according to claim 9, further comprising a microphone coupled to the processor so as to allow the processor to sample microphone signals generated by the microphone in response to sounds, and a manual input device coupled to the processor to allow the processor to sense the state of the manual input device.

15. An event annunciator according to claim 14, wherein the processor is capable of:

prompting a user of the annunciator to cause the security system to generate at least one sample flashing sequence;

storing a first set of attributes of the at least one sample flashing sequence in the memory;

prompting the user to speak a first announcement into the microphone;

storing in the memory a first speech synthesis segment derived from microphone signals generated when the user speaks the first announcement into the microphone; and reproducing the first announcement in response to receiving from the indicator light a flashing sequence with attributes matching the first set of attributes.

16. An event annunciator according to claim 14, further comprising a communication port, wherein the processor is capable of:

prompting a user of the annunciator to cause the security system to generate at least one sample flashing sequence;

storing a first set of attributes of the at least one sample flashing sequence in the memory;

prompting the user to input a first speech synthesis segment into the communication port, the first speech synthesis segment corresponding to a first announcement;

storing in the memory the first speech synthesis segment; and reproducing the first announcement in response to receiving from the indicator light a flashing sequence with attributes matching the first set of attributes.

17. A security system event annunciator comprising:

a speaker;

a sensing circuit coupled to an indicator light of a security system to generate a first signal with first and second states, each state of the first signal corresponding to a different state of the indicator light;

a processor under control of program code, the processor being coupled to the speaker and to the sensing circuit to delimit sequences of the first and second states of the first signal, select speech synthesis segments based on attributes of the delimited sequences, and cause the speaker to generate speech announcements corresponding to the attributes of the delimited sequences.

18. A security system event annunciator according to claim 17, further comprising a digital-to-analog converter (DAC) coupled between the processor and the speaker, wherein the processor sends data to the DAC to cause the DAC to drive the speaker to generate the announcements.

19. A security system event annunciator according to claim 18, wherein the processor uncompresses the data before sending the data to the DAC.

20. A security system annunciator according to claim 17, further comprising a microphone coupled to the processor so that the processor is capable of sensing microphone signals generated by the microphone in response to sound, wherein the processor is capable of obtaining speech synthesis segment data corresponding to the announcements by prompting a user of the security system to cause the security system to generate flashing of the indicator light, prompting the user to speak the announcements into the microphone, and recording the microphone signals generated in response to the user speaking the announcements.

21. A security system annunciator according to claim 17, further comprising means for learning sets of the attributes and the announcements corresponding to the sets of the attributes.

22. A method of converting event indications generated by an indicator light of a security system into speech announcements, the method comprising:

sensing states of the indicator light;

generating a first signal with a plurality of states, current state of the first signal being responsive to the states of the indicator light;

delimiting sequences of the states of the first signal;

determining attributes of the delimited sequences;

comparing attributes of each delimited sequence to sets of stored attributes to match attributes of said each delimited sequence to one of the sets of stored attributes;

retrieving speech synthesis segment data corresponding to said one of the sets; and using the speech synthesis segment data to generate an audible speech announcement.

23. A method according to claim 22, wherein the step of using the data comprises sending the data to a digital-to-analog converter (DAC) to cause the DAC to drive a speaker with an electronic audio signal corresponding to the audible speech announcement.

24. A method according to claim 22, further comprising uncompressing the data before the step of using the data to generate an audible speech announcement.

25. A method according to claim 24, wherein the step of using the data comprises sending the uncompressed data to a digital-to-analog converter (DAC) to cause the DAC to drive a speaker with an electronic audio signal corresponding to the audible speech announcement.

26. A method according to claim 22, further comprising:

prompting a user of the security system to cause the security system to flash the indicator light in response to an event;

delimiting a first sequence of the states of the first signal, the first sequence being caused by the user causing the security system to flash the indicator light in response to the event;

storing a first set of attributes of the first sequence;

prompting the user to speak a first announcement corresponding to the event; and recording the user speaking the first announcement as first speech synthesis segment data;

wherein:

the step of retrieving comprises retrieving the first speech synthesis segment data when attributes of said each delimited sequence match the first set of attributes; and the step of using comprises using the first speech synthesis segment data to generate the first announcement.

27. A method according to claim 22, further comprising step for storing the sets of attributes and recording the speech synthesis segment data corresponding to the sets of attributes.

* * * * *